United States Patent Office 3,812,196
Patented May 21, 1974

---

3,812,196
CATALYTIC STEAM DEALKYLATION
Masao Uchiyama and Norio Kaneko, Ibaraki, Japan, assignors to Mitsubishi Petrochemical Company Limited, Chiyoda-ku, Tokyo-to, Japan
No Drawing. Filed Nov. 26, 1971, Ser. No. 202,640
Claims priority, application Japan, Nov. 30, 1970, 45/105,709, 45/105,710, 45/105,711
Int. Cl. C07c 3/58
U.S. Cl. 260—672
9 Claims

ABSTRACT OF THE DISCLOSURE

An alkylaromatic hydrocarbon is dealkylated by contacting it, in the presence of steam and at a temperature ranging from 350 to 500° C., with a catalyst comprising nickel, and at least one metal selected from palladium, iron, iridium, rhodium, thallium, cerium, selenium, antimony, cadmium, tungsten, barium, sodium, potassium, and rhenium, supported on a carrier, preferably alumina.

BACKGROUND

This invention relates generally to catalytic steam dealkylation of alkylaromatic hydrocarbons. More specifically, the invention relates to a new and advanced process therefore wherein an alkylaromatic hydrocarbon is contacted with a novel catalyst in the presence of steam, thereby to effect dealkylation of the hydrocarbon with high conversion and high selectively.

Heretofore, processes for carrying out dealkylation of alkylaromatic hydrocarbons in a thermal or catalytic manner in the presence of hydrogen have been known and have been practiced on an industrial scale. While high conversion and high selectivity can be attained, in general, an economical disadvantage of these processes lies in requirement for a large quantity of expensive hydrogen and for the unavoidable conversion of the side-chain alkyl group into low-value methane.

On the other hand, several researches on this dealkylation through the use of low-cost steam instead of expensive hydrogen are being undertaken. While a dealkylation procedure of this character can be called a steam dealkylation process, the reaction of this catalytic steam dealkylation process is characterized in that the alkylaromatic hydrocarbon is contacted with a catalyst in the presence of steam to cause, principally, demethylation and thereby to obtain an aromatic hydrocarbon having a number of methyl groups which is less by one or more groups, and at the same time, there is obtained a gas rich in hydrogen such as, for example, a gas comprising from 65 to 75 mole percent of $H_2$, from 20 to 25 mole percent of $CO_2$, from 0.5 to 7 mole percent of CO, and from 0.5 to 4 mole percent of $CH_4$.

Accordingly, it may be considered that the principal reaction conforms to the following equation, wherein $\phi$ is an aromatic nucleus.

$$(CH_3)m\phi + 2H_2O \rightarrow (CH_3)(m-1)\phi + CO_2 + 3H_2 \quad (1)$$

It may be considered that in an alkylaromatic having two or more carbon atoms outside of the aromatic nucleus, the reaction of Equation (1) progresses parallelly or successively Simultaneously with the reaction of Equation (1), formation of methane and carbon monoxide, cleavage of the aromatic nucleus, formation of carbon, and other reactions occur. Typical reactions can be considered to occur in conformity with the following equations.

CO formation:
$$(CH_3)m\phi + H_2O \rightarrow (CH_3)(m-1)\phi + CO + 2H_2 \quad (2)$$

$CH_4$ formation:

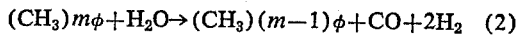

The cleavage of the aromatic nucleus and the carbon formation can be considered to be, in the case of mononuclear alkylaromatic hydrocarbons, for example, in conformity with the following equations.

$$(CH_3)m\phi + (2m+6)H_2O \rightarrow$$
$$(m+6)CO_2 + (3m+15)H_2 \quad (4)$$
$$(CH_3)m\phi \rightarrow (m+6)C + \tfrac{1}{2}(3m+5)H_2 \quad (5)$$

The selectivity of a reaction in which the aromatic nucleus is retained, such as the reactions representable by Equations (1), (2), and (3), is herein called the "nucleus retention" or the "dealkylation selectivity."

Heretofore, numerous proposals relating to steam dealkylation reactions have been made. The principal catalyst systems used in these proposals are four carried nickel-based catalysts, namely, nickel-alumina, nickel-chromia, nickel-magnesia, and nickel-beryllia catalysts, which are reported to exhibit substantially equal performances. Representative proposals relating to nickel-alumina systems are disclosed in the specification of U.S. Pat. No. 2,436,923, by G. N. Maslyanskii and others in "Neftekhim.," *1*, (2), 182–186 (1961), and other publications.

While these proposals are valuable in that they contribute respective solutions to controversial problems, it is difficult to say that they are fully satisfactory from an industrial standpoint.

More specifically, the specification of U.S. Pat. No. 2,436,923, for example, describes a process for dealkylation at from 180 to 350° C. through the use of a catalyst comprising a Group VIII metal of the periodic table (of an atomic number of 27 or higher) carried on alumina, silica, or diatomaceous earth. In a specific example, toluene was dealkylated at from 263 to 266° C. through the use of a catalyst comprising nickel carried on diatomaceous earth. The benzene content of the liquid reaction products, however, was as low as 6 percent.

According to the above disclosure of G. N. Maslyanskii and others, furthermore, toluene was dealkylated at 430° C. with the use of a catalyst comprising nickel carried on alumina, whereupon a benzene yield of 28.7 percent by weight and a dealkylation selectivity of 75.3 mole percent were obtained. This result cannot be said to be adequate.

In a addition, some attempts have been made to improve nickel-based catalysts on alumina, one example being that reported by C. Krögel and others in "Brenstoff Chem.," *44*, (66), 170–175 (1963), in which it is reported that some improvement is attained by adding Cr, Cu, or Mo.

In still another prior endeavor as disclosed in Japanese Patent Publication No. 27282/1969, a catalyst comprising 3.85 Re—2.35 Ag—0.2 K—100 $Al_2O_3$ and having theo bject of steam reforming was used, and with toluene containing a small quantity of a sulfur compound as the starting material, reaction was carried out under the conditions of a pressure of 40 kg./cm², LHSV=0.5 hour⁻¹, mole ratio $H_2O$/toluene of from 5 to 10.1, and a reaction temperature of from 550 to 750° C. It is reported that, as a result, the liquid reaction products contained from 21 to 33 percent by weight of benzene, and that it is also possible to use metals such as Ni as a catalyst in place of the Ag. This result, however, still cannot be said to be adequate.

SUMMARY

It is an object of this invention to overcome the deficiencies and difficulties as described above of the prior art in providing a process for catalytic steam dealkylation of alkylaromatic hydrocarbons with high conversion and high dealkylation selectivity.

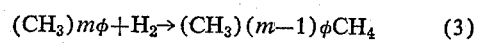

According to this invention, briefly summarized, there is provided a process as stated above which comprises contacting an alkylaromatic hydrocarbon in the presence of steam with a catalyst comprising nickel and at least one metal selected from palladium, iron, iridium, rhodium, thallium, cerium, selenium, antimony, cadmium, tungsten, barium, sodium, potassium, and rhenium thereby to dealkylate the alkylaromatic hydrocarbon.

The nature, utility, and further features of this invention will be apparent from the following detailed description beginning with a consideration of general aspects of the invention and concluding with specific examples of practice illustrating preferred embodiments of the invention.

DETAILED DESCRIPTION

In accordance with one embodiment (A) of this invention providing a process for catalytic steam dealkylation of alkylaromatic hydrocarbons, an alkylaromatic hydrocarbon is caused to contact with a catalyst comprising essentially (a) nickel, (b) at least one metal selected from the group consisting of palladium, iron, iridium, and rhodium, and alumina in the presence of steam and at a temperature ranging from 350 to 500° C.

In accordance with another embodiment (B) of this invention an alkylaromatic hydrocarbon is contacted by a catalyst comprising, as its essential catalytic ingredients, (a) nickel and (b) at least one metal selected from the group consisting of thallium, cerium, selenium, antimony, cadmium, tungsten, barium, sodium, and potassium in the presence of steam.

In accordance with still another embodiment (C) of this invention, an alkylaromatic hydrocarbon is contacted by a catalyst comprising, essentially, (a) nickel, (b) rhenium, and (c) alumina in the presence of steam and at a temperature ranging from 350 to 500° C.

Thus, in the practice of this invention, fundamentally, steam dealkylation is carried out under relatively moderate conditions through the use of a catalyst, which should be called a promoted (or modified) nickel catalyst, to obtain excellent results.

More specifically, in the above described embodiment (A) of this invention, a novel catalyst carried on a specific carrier is used at a temperature in a specific range. For example, at a low reaction temperature of approximately 400° C., in general, a conversion of over 35 percent (ordinarily of the order of from 40 to 55 percent), a dealkylation selectivity of the order of over 90 percent (ordinarily of the order of from 95 to 98 percent), and a yield of the order of over 35 percent (ordinarily of the order of from 40 to 55 percent) can be expected.

At a high reaction temperature of approximately 450° C., in general, a conversion over some 40 percent (ordinarily of the order of from 50 to 70 percent), a dealkylation selectivity over 83 percent (ordinarily of the order of from 85 to 92 percent, and a yield above 40 percent (ordinarily of the order of from 45 to 65 percent) can be expected.

In accordance with the above described embodiment (B) of this invention, at a low reaction temperature of approximately 400° C., in general, a conversion over 40 percent (ordinarily of the order of from 45 to 55 percent), a dealkylation selectivity of over 73 percent (ordinarily of the order of from 75 to 95 percent), and a yield higher than 35 percent (ordinarily of the order of from 37 to 45 percent) can be expected.

At a high reaction temperature of approximately 450° C., in general, a conversion above 50 percent (ordinarily of the order of from 55 to 65 percent), a dealkylation selectivity higher than 70 percent (ordinarily of the order of from 75 to 90 percent), and a yield higher than 40 percent (ordinarily of the order of from 45 to 55 percent) can be expected.

Furthermore, according to the above described embodiment (C) of this invention, at a low reaction temperature of approximately 400° C., in general, a conversion above 40 percent (ordinarily of the order of from 45 to 50 percent), a dealkylation selectivity higher than 90 percent (ordinarily of the order of from 93 to 95 percent), and a yield higher than 35 percent (ordinarily of the order of from 40 to 50 percent) can be expected.

At a high reaction temperature of approximately 450° C., in general, a conversion higher than 45 percent (ordinarily of the order of from 50 to 70 percent) a dealkylation selectivity above 75 percent (ordinarily of the order of from 80 to 90 percent), and a yield over 40 percent (ordinarily of the order of from 50 to 60 percent) can be expected.

Process details

1. Starting alkylaromatic hydrocarbon: The term alkylaromatic hydrocarbons, constituting starting materials in the practice of this invention, is herein used to designate collectively aromatic hydrocarbons each having an alkyl group or mixtures of hydrocarbons containing the same. For the alkyl group, a lower alkyl group is desirable. Specific examples of suitable aromatics are as follows.

1. Mononuclear aromatics having alkyl groups.
1–a. Monoalkylbenzenes such as toluene, ethylbenzene, cumene, and n-propylbenzene.
1–b. Polyalkylbenzenes such as polymethylbenzene (e.g., xylene isomers and trimethylbenzene isomer and ethyltoluene isomers)
2. Polynuclear aromatics having alkyl groups (e.g., methylnaphthalene)
3. Mixtures of two or more alkylaromatic hydrocarbons (e.g., mixtures of toluene and xylene)

As indicated in an example set forth hereinafter, in the case where an aromatic hydrocarbon having two or more carbon atoms in side chain is used as the starting material, two or more aromatics are obtained as reaction products. Accordingly, it is self-evident that mixtures of these aromatics are formed during the reaction, and it is apparent that such mixtures can become starting materials of this reaction.

4. Mixtures of aromatics having alkyl groups and non-aromatics.

When such a mixture is used as a starting material, a portion of the non-aromatic decomposes.

2. Catalyst: A catalyst according to this invention comprises, essentially, nickel, one or more additive metals selected from Pd, Fe, Ir, Rh, Tl, Ce, Se, Sb, Cd, W, Ba, Na, K, and Re, and preferably a carrier, particularly alumina. While the details with respect to the actual forms in which these ingredients exist are not clear, they may be presumed to be as follows.

One portion of the nickel is in the state of an oxide, but most of the nickel is in the state of nickel metal or in a state of combination (including a solid solution) with another ingredient. With respect to the steam dealkylation reaction, the active center of the catalyst is nickel metal or a solid solution of nickel metal and an additive metal. Nickel oxide is formed by the oxidation of nickel metal reacting with steam which occurs simultaneously during the dealkylation reaction.

While most of the alumina exists as alumina per se and is functioning as a carrier, a portion thereof is in a state of combination with another ingredient. In the latter case, nickel aluminate are formed, for example by interaction of alumina with nickel. Since nickel aluminate lowers the activity of the catalyst, it is preferable to prepare the catalyst in a manner to reduce the formation thereof as much as possible.

A portion of the additive metal forms a solid solution with the nickel, whole another portion exists as an oxide or as the metal.

Accordingly, any catalyst preparation method can be used provided that it produces a catalyst of the above indicated nature. Examples of possible methods are a co-precipitation method, a kneading method, a method of impregnation into carrier particles, and a method of impregnation into carrier powder and drying, (for example, a method wherein powdered alumina is steeped in an aqueous solution of the substance to be carried, the solution is evaporated to dryness). The mixture obtained in accordance with any of these ordinary methods of preparing catalysts is subjected to reduction or calcination-reduction thereby to prepare the objective catalyst.

Source of the nickel

With respect to the steam dealkylation reaction, active center of the catalysts is nickel metal or a solid solution of the nickel metal and the additive metal. Accordingly, any nickel compound can be used as the nickel source provided that it is capable of producing nickel metal when subjected to reduction or calcination-reduction. In general, it is preferable to use a nickel source which does not form nickel compounds other than nickel or nickel oxide after reduction or calcination-reduction. Therefore, a nickel compound is selected in relation to the conditions of the reduction or calcination-reduction.

Specific examples of the nickel source are nickel nitrate, basic nickel carbonate, nickel hydroxide, nickel formate, and nickel acetate. Of these, nickel nitrate and basic nickel carbonate are particularly preferable.

Source of the carrier

For the carrier, a substance which is excessively acidic is not desirable. Suitable carriers are silica, chromia, magnesia, titania, zirconia, and alumina, particularly alumina.

$\tau$-alumina is highly suitable for use in the case of the above mentioned method of impregnation into carrier particles, the kneading method, and the method of impregation into carrier powder and drying.

Since an ordinary process can be used in the case of the co-precipitation method all carrier sources suitable for these ordinary methods can be used.

Source of the additive metal

In general, an additive metal source which can be rendered into the metal or an oxide thereof after reduction or calcination-reduction can be used. However, the water soluble compounds are preferably used to attain suitable mixing thereof with other ingredients (nickel and alumina). Furthermore, an additive metal source which does not form an ingredient other than the objective one after the reduction or calcination-reduction is particularly preferable.

Example of suitable additive metal sources are nitrates, carboxylates, chlorides, oxides, and polyacids of the metals.

Specific examples of suitable compounds for the additive metal source are as follows.

Palladium: palladium nitrate, palladium chloride, dihydrate, palladium sulphate
Iron: ferric acetate, ferric chloride, ferrous chloride, ferrous oxalate, ferric oxalate, ferric nitrate, ferrous nitrate
Iridium: iridium chlorides, iridium sulphate, iridium oxide
Rhodium: rhodium trichloride, rhodium nitrate
Thallium: thallium hydroxide, thallium nitrates, thallium oxalates
Cerium: cerium chloride, cerium nitrate, cerium acetate, cerium oxides
Selenium: sellenium oxide
Antimony: antimony chloride, antimony oxides
Cadmium: cadmium acetate, cadmium chloride, cadmium nitrate, cadmium oxide
Tungsten: ammonium paratungstate
Barium: barium formate, barium nitrite, barium nitrate, barium formate, barium hydroxide, barium chloride
Sodium: sodium carbonate, sodium bicarbonate, sodium hydroxide, sodium nitrate
Potassium: potassium carbonate, potassium bicarbonate, potassium hydroxide, potassium nitrate
Rhenium: rhenium chloride, ammonium perrhenate

Nickel content

A suitable nickel content within the catalyst of this invention depends on various factors, but, in general, it is ordinarily of the order of from 10 to 200 parts by weight, particularly from 10 to 150 parts by weight with respect to 100 parts of the carrier (alumina).

Since the activity of this catalyst decreases when the nickel and alumina therewithin combine to form nickel aluminate, it is necessary to use a large quantity of the nickel in the case of a catalyst preparation process in which nickel aluminate is easily formed. Furthermore, the suitable nickel content varies also with the properties of the alumina used. For example, it is necessary when the bulk density of the alumina is high to use a small nickel content and, conversely, to use a large nickel content when the alumina bulk density is low.

In addition, even by a process wherein the nickel is carried on the alumina, the optimum content of the nickel varies. For example, in a catalyst prepared by impregnating by an ordinary method alumina particles molded by an ordinary method, a small value of the optimum nickel content suffices. On the other hand, in the case of a catalyst prepared by steeping alumina powder in an aqueous solution of a nickel salt and evaporating the solution to dryness, a catalyst prepared by kneading alumina powder and a nickel salt in accordance with an ordinary process, or a catalyst prepared by coprecipitation according to an ordinary process, the optimum nickel content becomes high.

In general, however, a desirable nickel content is in the range of from 20 to 150, preferably from 30 to 130 parts with respect to 100 parts of the alumina.

Quantity of additive metal

While the quantity added of the additive metal differs somewhat with the kind of the additive metal, in the case of Pd, Ir, and Rh in the aforementioned embodiment (A) of this invention, a suitable weight ratio relative to the nickel, calculated as on the basis of the metal, is from 0.03 to 5, preferably from 0.1 to 3. In the case of iron, this weight ratio is from 0.3 to 30, preferably from 2 to 20.

In the case of Tl, Ce, Se, Sb, Cd, W, Ba, Na, and K in the aforementioned embodiment (B) of the invention, a suitable weight ratio relative to the nickel is from 0.03 to 5, preferably from 0.1 to 3.

In the aforementioned embodiment (C) of the invention, a suitable weight ratio of the metal Re added, relative to the nickel, is from 0.03 to 6.0, preferably from 0.1 to 3.

Carrying on the carrier (1) Nickel: Various known carrying methods can be used. Examples are coprecipitation, kneading, and impregnation methods and the method of impregnation into powder and drying. A specific example of the kneading method comprises introducing a suitable quantity of water into a mixture of a nickel compound insoluble in water, such as nickel carbonate or nickel hydroxide, and alumina and mixing the resulting mixture by kneading.

(2) Additive metal: There is no specific sequence in which the nickel and additive metal must be carried on the alumina. However, in order to obtain good mixing with the nickel, the additive metal is preferably added simultaneously with the nickel or after the nickel has been carried.

In the former case, when the kneading method, for example, is used, the additive metal source is dissolved in water if it is water soluble or is mixed directly into the kneaded material if it is insoluble in water. When the impregnation method is used, the alumina is impregnated with an aqueous solution in which a nickel salt and a salt of the additive metal have been dissolved.

Reduction or calcination-reduction

The principal purpose of the reduction or calcination-reduction is to decompose the salts of nickel and additive metal and, as was theoretically considered hereinbefore, to provide the nickel as nickel metal and the additive as the metal or an oxide thereof or to form a solid solution of the two metals.

Accordingly, in the case where only reduction is carried out, a temperature higher than the decomposition temperatures of the sources of the nickel and the additive metal and moreover, higher than at least the reducing temperature of the product (thought to be nickel oxide) of decomposition of the source of the nickel metal is necessary. Since the reducing temperature varies somewhat depending on the source of the additive metal, it is difficult to specify precisely the reducing temperature, but, in general, it is the ordinary practice to carry out the reduction at a temperature of from 400 to 650° C.

When carrying out calcination-reduction, in general, decomposition of the sources of the nickel and the additive metal is accomplished by the calcination, and reduction of the resulting product of composition is accomplished by the reduction. Accordingly, since the decomposition of the component metal sources is the principal object in the calcination, the lower limit of the calcination temperature is the decomposition temperature. While it is difficult to determine precisely the upper limit, it is necessary to determine this upper limit by taking into consideration factors such as the restrictive control of the formation of nickel aluminate and control of the decrease in the surface area of the alumina. In general, the standard value of this upper limit is from 400 to 700° C., preferably from 400 to 600° C.

In the selection of the reducing temperature, it is necessary to consider the degree of formation of nickel aluminate due to the reasons set forth hereinbefore and factors such as the calcination temperature. Accordingly, it is difficult to determine precisely the reducing temperature also. In general, the standard values of the reducing temperature is from 300 to 700° C., preferably from 350 to 600° C.

Calcination can be carried out in an atmosphere of either air or an inert gas (e.g., nitrogen).

Reduction is preferably carried out with hydrogen, but other ordinary reduction methods such as reduction with alcohol can be used.

3. Steam dealkylation reaction.

*Temperature:* With the use of the catalyst of this invention, the cleavage of the nucleus increases with rising temperature, and the quantity of gas formed increases, whereby the reaction becomes similar to the so-called steam reforming reaction wherein a gasification of a hydrocarbon is the object. Therefore, for maintaining the selectivity of the dealkylation reaction at a high level, a very high reaction temperature is undesirable. In general, the reaction is carried out at a temperature of from 350 to 500° C., preferably from 400 to 470° C.

*Pressure:* In general, when the pressure is raised, the conversion increases for the same rate of supply of the starting material. When an excessive high pressure is used, however, the selectivity of the dealkylation tends to decease.

Accordingly, while there is no special necessity of restricting the pressure, there is not much advantage in using a very high pressure. Therefore, the ordinary range is from atmospheric pressure to 100 kg./cm.$^2$ g., preferably from atmospheric pressure to 50 kg./cm.$^2$ g., and more preferably from atmospheric pressure to 30 kg./cm.$^2$ g.

*Material feed rate:* The rate of feed or supply of the starting material in terms of weight hourly space velocity (WHSV) is from 0.2 to 4.5 weight per weight per hour as a standard and preferably from 0.3 to 3.0 weight per weight per hour.

*Mole ratio of water to starting-material alkylaromatic hydrocarbon:* In this reaction, water is indispensable, and the reaction progresses according to Equation (1) set forth hereinbefore. Therefore, the mole ratio of the water to the starting aromatic hydrocarbon is 2 or more as a standard. While there is no special upper limit, an excessive quantity of water will give rise to a decrease in the selectivity of the dealkylation reaction. For this reason, the standard upper limit is of the order of 20. Accordingly, this mole ratio is preferably from 2 to 15, more preferably from 3 to 10.

*Operation:* The operation can be carried out by any mode of practice which makes possible reaction of the solid catalyst and the gaseous reactants. In each of the following examples, a fixed-bed catalyst is used, but it will be apparent that a fluidized bed or some other non-fixed-bed catalyst can also be used.

In order to indicate more fully the nature and utility of this invention, the following specific examples of practice constituting preferred embodiments of the invention and results are set forth, it being understood that these examples are presented as illustrative only, and that they are not intended to limit the scope of the invention.

4. Examples: In the following examples, the results of activity tests were determined in the following manner.

Since a material balance cannot be fully attained in experimental apparatus of small scale, we determined the conversion and the selectivity of the dealkylation reaction by idealizing or simplifying the reaction.

As mentioned hereinbefore, the greater part of the generated gases comprises $H_2$ and $CO_2$, while the quantities of $CO$ and $CH_4$ are very small. The mole ratio of $H_2$ to $CO_2$ is approximately 3:1. Furthermore, as the carbon deposit on the catalyst is negligible, it can be thought that the dealkylation reaction occurs principally according to Equation (1), and the reaction of nuclear cleavage progresses principally according to Equation (4).

Assuming that only the reaction of Equations (1) and (4) occur, the conversion and dealkylation reaction selectivity can be determined from the composition of the liquid reaction products and the gas generation rate. For example, in the case where toluene is used as the starting material, when the benzene content within the liquid reaction product is denoted by $\alpha$ (percent by weight), and the value of $R_1/R_2$ is denoted by $\beta$ (—) where $R_1$ is the gas generation rate (liter/hour) and $R_2$ is the gas generation rate (liter/hour) under the assumption that the total quantity of the toluene supplied reacts according to Equation (1), the following relationships are valid between the conversion $y$ (mole percent), the dealkylation reaction selectivity $x$ (mole percent), $\alpha$, and $\beta$.

$$y = \frac{4\beta}{(25-0.21x)} \times 100 \qquad (6)$$

$$\alpha = \frac{0.78xy}{0.78xy - 92(100-y)} \times 100 \qquad (7)$$

By solving Equations (6) and (7), $x$ and $y$ can be determined.

The yield $z$ (mole percent) can be determined from the following equation.

$$z = xy/100 \qquad (8)$$

Example IA (Ni-Pd-Al catalyst)

(1) Catalyst preparation A: The method of impregnation into powder and drying was used.

Specifically, specific quantities of nickel nitrate and the nitrate of an additive were added to and dissolved in distilled water of a weight which was 6 times that of alumina. To the resulting solution, alumina in powder form (ignition loss=25.6 percent by weight (wet basis), apparently specific gravity=0.29) was added, and the resulting preparation was thoroughly agitated over a hot-water bath to evaporate off the water. If the agitation during this step is insufficient, the solution and the carrier will separate, and the catalyst will become non-uniform, whereby a catalyst of food performance will become unattainable.

Since the viscosity of the preparation increases as the water evaporation progresses, the preparation, after the liquid and the powder no longer separated when left standing, was placed for 24 hours in an air bath at 120° C. for thorough drying thereof. The material thus dried was then placed in a muffle furnace heated beforehand to 550° C. and was baked for three hours in an atmosphere of air. The resulting catalyst material was then molded into the shape of a cylinder of 4-mm. in diameter and 4-mm. in length. The catalyst thus molded was placed in a stainless-steel reactor tube, reduced, and then used in a reaction.

The expression, a Ni-bX-100 $Al_2O_3$, represents the composition that of the catalyst, i.e., with respect to 100 parts by weight (wet basis) of alumina $Al_2O_3$, there are "$a$" parts by weight of Ni as metal and $b$ parts by weight of the additives as metals.

(2) Operation: A reaction was carried out in a flow reactor according to the following procedure:

(i) A reactor is placed in an electric furnace, the temperature of which is raised as nitrogen is passed through the reactor at a flowrate ranging from 10 to 30 liters/hour.

(ii) When the furnace temperature becomes approximately 300° C., the flowing gas is switched to hydrogen, and the furnace temperature is raised to and held at 450° C. as the hydrogen is passed through the reactor at a rate of ranging from 10 to 30 liters/hour. The hydrogen reduction is carried out for 3 hours from the start of flow of hydrogen and approximately 2.5 hours from the time at which the temperature reaches 450° C.

(iii) The flow of hydrogen is stopped, and distilled water is passed through the reaction tube at a specific flowrate for 30 minutes thereby to sweep out the hydrogen within the tube and, simultaneously, to accomplish pretreatment of the catalyst. During this step, the temperature of the reaction tube is adjusted to a specific value.

(iv) A starting alkylaromatic hydrocarbon is passed through the reactor at a specific flowrate to start the reaction.

(v) The liquid reaction product is collected during the 120 minutes from 25 minutes to 145 minutes after the start of the reaction and analized.

(3) Reaction conditions:

Starting material: toluene
Catalyst: 15 g.
Pressure: atmospheric
WHSV=0.54 weight/hr./weight
$H_2O$/toluene, mole ratio: 5.87

(4) Experimental results: Catalyst: 50 Ni-2Pd-100 $Al_2O_3$.

Reaction temp. (° C.) _____ 400
$\alpha$ _____ 53.3
$\beta$ _____ 0.68
$x$ _____ 97
$y$ _____ 58
$z$ _____ 56

In the above table and hereinafter, $\alpha$, $\beta$, $x$ and $y$ respectively denote the same quantities as before. $z$ is the yield (mole percent).

Example IIA (Ni-Ir-Al catalyst)

(1) Catalyst preparation B: The kneading method was used.

Specifically, an appropriate quantity of distilled water was added to specific quantities of basic nickel carbonate and alumina, and a salt of the additive metal was added thereto at the same time. The resulting process materials were kneaded for approximately 1 hour in a kneader. The material thus kneaded was then dried and baked under the same conditions as those for the method of impregnation into powder and drying (catalyst preparation A).

(2) Reaction operation: same as Example IA.

(3) Reaction conditions: according to Example IA except that the catalyst quantity was 10 g., and WHSV=0.91 hour$^{-1}$.

(4) Experimental results

| Additive metal | Reaction temp. (° C.) | Catalyst | $\alpha$ | $\beta$ | $x$ | $y$ | $z$ |
|---|---|---|---|---|---|---|---|
| Rh | 400 | 150 Ni-0.5 Rh-100 $Al_2O_3$ | 33.0 | 0.43 | 97 | 38 | 37 |
| Ir | 400 | 150 Ni-0.5 Ir-100 $Al_2O_3$ | 31.0 | 0.35 | 99 | 35 | 35 |

Example IIIA (Ni-Fe-$Al_2O_3$ catalyst)

(1) Catalyst preparation: same method as in Example IA.

(2) Reaction operation: same procedure as in Example IA.

(3) Reaction conditions: same as in Example IA.

(4) Experimental results: Catalyst: 75 Ni-0.5 Fe-100 $Al_2O_3$

Additive metal _____ Fe
Reaction temp. (° C.) _____ 400
$\alpha$ _____ 38.8
$\beta$ _____ 0.64
$x$ _____ 92
$y$ _____ 45
$z$ _____ 41

Example IVA (Pd content variation)

In this example, the weight ratio Ni:$Al_2O_3$ was held constant (=50:100), and the Pd content was varied in preparing catalysts, which were subjected to an activity test.

The catalyst preparation method, reaction operation, and reaction conditions were the same as those of Example IA. The results were as follows.

| Reaction temp. (° C.) | Catalyst | $\alpha$ | $\beta$ | $x$ | $y$ | $z$ |
|---|---|---|---|---|---|---|
| 400 | 50 Ni-0.05 Pd-100 $Al_2O_3$ | 34.4 | 0.43 | 98 | 38 | 37 |
| 450 | | 61.6 | 1.00 | 91 | 67 | 61 |
| 400 | 50 Ni-0.5 Pd1-00 $Al_2O_3$ | 34.0 | 0.44 | 97 | 38 | 37 |
| 450 | | 42.0 | 0.72 | 91 | 48 | 44 |
| 400 | 50 Ni-2 Pd-100 $Al_2O_3$ | 53.3 | 0.68 | 97 | 58 | 56 |
| 450 | | 57.0 | 1.25 | 83 | 65 | 54 |
| 400 | 50 Ni-3.18 Pd-100 $Al_2O_3$ | 27.2 | 0.37 | 96 | 32 | 31 |
| 450 | | 56.0 | 0.96 | 90 | 63 | 57 |

Example VA (Fe content variation)

In this example, catalysts were prepared by holding the weight ratio Ni:$Al_2O_3$ constant at 75:100, while the Fe content was varied. An activity test was carried out on these catalysts.

The catalyst preparation method, the reaction operation, and the reaction conditions were the same as those of Example IA. The results were as follows.

| Reaction temp. (° C.) | Catalyst | $\alpha$ | $\beta$ | $x$ | $y$ | $z$ |
|---|---|---|---|---|---|---|
| 400 | 75 Ni-0.5 Fe-100 $Al_2O_3$ | 38.8 | 0.64 | 92 | 45 | 41 |
| 400 | 75 Ni-5 Fe-100 $Al_2O_3$ | 46.5 | 0.50 | 99 | 51 | 50 |
| 400 | 75 Ni-20 Fe-100 $Al_2O_3$ | 40.0 | 0.79 | 88 | 48 | 42 |

Example VIA (Ni content variation)

In a Ni-Pd-$Al_2O_3$ catalyst, the weight ratio Ni:Pd was held constant at 100:1, and the Ni content was varied as indicated below to prepare catalysts, which were then subjected to an activity test, whereupon the following results were obtained.

| Reaction temp. (° C.) | Catalyst | α | β | x | y | z |
|---|---|---|---|---|---|---|
| 400 | } 50 Ni-0.5 Pd–100 Al₂O₃ | { 34.0 | 0.43 | 97 | 38 | 37 |
| 450 | | { 42.0 | 0.72 | 91 | 48 | 44 |
| 450 | 100 Ni-1 Pd–100 Al₂O₃ | 61.0 | 1.20 | 86 | 68 | 58 |

Example VIIA (Pd starting material)

In all of the preceding examples, palladium nitrate was used as the source material of the Pd of the catalysts used. In this example, palladium chloride was used for this purpose, whereupon the results indicated that catalysts having activities substantially equal to those of catalysts prepared from palladium nitrate can be thereby prepared.

The catalyst preparation method was the same as that of Example IA except for the use of palladium chloride instead of palladium nitrate. The reaction operation and the reaction conditions were the same as those of Example IA. The following results were obtained.

| Reaction temp. (° C.) | Catalyst | α | β | x | y | z |
|---|---|---|---|---|---|---|
| 400 | } 50-Ni-0.5 Pd–100 Al₂O₃ | { 48.8 | 0.58 | 98 | 53 | 52 |
| 450 | | { 69.8 | 1.06 | 92 | 75 | 69 |

Comparison Example IA

This comparison example indicates that $Al_2O_3$ is particularly effective as a carrier. In a Ni-Pd-(carrier) catalyst system, alumina, silica, and diatomaceous earth were used for the carrier to prepare respective catalysts.

(1) Catalyst preparation: In the case where alumina was used as the carrier, the catalyst preparation was the same as that in Example IA except for the use of palladium chloride for the Pd source.

In the case of a diatomaceous earth carrier, the preparation was the same as that in Example IA except for the use of diatomaceous earth instead of alumina and the use of palladium chloride instead of palladium nitrate.

In the case of a silica carrier, the following catalyst preparation method was adopted. Nickel nitrate and palladium chloride were dissolved in distilled water of a quantity 6 times that of the $SiO_2$, and the resulting solution was mixed with silica-sol dispersed in aqueous ammonia (commercial name "Snowtex," 20.5 percent by weight of $SiO_2$). The water in the resulting mixture was evaporated to dryness on a hot-water bath and then subjected drying and baking. The drying and baking conditions were the same as those in Example IA.

(2) Operation and reaction conditions were the same as those of Example IA.

(3) Results

| Carrier | Reaction temp. (° C.) | Catalyst | α | β | x | y | z |
|---|---|---|---|---|---|---|---|
| Al₂O₃ (this invention) | { 400<br>450 | } 50 Ni-0.5 Pd–100 Al₂O₃ | {48.8<br>{69.8 | 0.58<br>1.06 | 98<br>92 | 53<br>75 | 52<br>69 |
| SiO₂* | 400 | 50 Ni-0.5 Pd–100 SiO₂ | 10.5 | 0.32 | 73 | 15 | 11 |
| Diatomaceous earth* | { 400<br>450 | } 50 Ni-0.5 Pd–100 (diatomaceous earth) | { 4.5<br>{ 7.2 | 0.18<br>0.37 | 72<br>63 | 7<br>13 | |

*Comparison example.

Example VIIIA (dealkylation of various alkylaromatic hydrocarbons)

In all of the preceding examples toluene was used as the starting material. In the instant example, various alkylaromatic hydrocarbons were used as starting materials, and a 100 Ni-1 Pd–100 Al₂O₃ catalyst was used.

The catalyst preparation method and the reaction operation were the same as those of Example IA. The reaction conditions were as follows.

Catalyst quantity: 15 g.
Reaction temperature: 400° C.
Pressure: atmospheric pressure
Rate of supply of starting material hydrocarbon: 9.33 cc./hr.
Rate of supply of water: 9.33 cc./hr.

| Starting material | Formed product | Liquid reaction product composition Content (wt. percent) |
|---|---|---|
| m-Xylene | Benzene | 8.4 |
| | Toluene | 40.3 |
| | Unreacted m-xylene | 51.3 |
| Ethylbenzene | Benzene | 22.8 |
| | Toluene | 13.8 |
| | Unreacted ethylbenzene | 63.4 |
| Mixed starting material[1] | Benzene | 20.7 |
| | Toluene | 19.3 |
| | n-Heptane | 7.9 |
| | Cyclohexane | 5.4 |
| | Ethylbenzene | 16.6 |
| | m-Xylene | 30.1 |

[1] See the following table:

| Constituent | Content (wt. percent) |
|---|---|
| n-Heptane | 10.6 |
| Cyclohexane | 10.6 |
| Ethylbenzene | 39.4 |
| m-Xylene | 39.4 |

Comparison Example IIA

This comparison example indicates that the optimum reaction temperature is from 350 to 500° C.

100 Ni-1 Pd–100 Al₂O₃ was used as the catalyst. The catalyst preparation method, the operation, and the reaction conditions were the same as those in Example IA.

| Reaction temperature (° C.) | α | β | x | y | z |
|---|---|---|---|---|---|
| 300 (comparison example) | 0 | 0 | | 0 | 0 |
| 450 (this invention) | 61.0 | 1.20 | 86 | 68 | 58 |
| 500 (this invention) | 32.0 | 1.25 | 67 | 46 | 31 |

Comparison Example IIIA

This comparison example indicates the effectiveness of the additive metal of this invention, and that specific metals among Group VIII metals are effective.

The catalyst preparation method was the same as that of Example IA.

The reaction conditions were as follows.

Starting material: toluene
Catalyst quantity: 50 cc.
Reaction temperature: 400° C., 450° C.
Pressure: atmospheric pressure
LHSV=1.0
($H_2O$/toluene) mole ratio=5.87

The reaction operation was as specified in Example IA except that steam treatment was carried out for one hour, and then the reaction was started. The reaction was carried out continuously for 10 hours 40 minutes at 400° C., then for 3 hours 40 minutes at 420° C., and finally for 3 hours and 40 minutes at 450° C. Sampling and analysis of the liquid reaction product was carried out with respect to the liquid reaction product corresponding to the period between 15 hours and 16 hours 30 minutes from the start of the reaction.

The following results were obtained.

| Catalyst | Reaction temp. (°C.) | α | β | x | y | z |
|---|---|---|---|---|---|---|
| 100 Ni-100 Al₂O₃ (comparison example) | 450 | 20.0 | 0.40 | 88 | 25 | 22 |
| 100 Ni-1 Pt-100 Al₂O₃ (comparison example) | 450 | 13.5 | 0.13 | 99 | 13.6 | 13 |
| 100 Ni-1 Pd-100 Al₂O₃ (this invention) | 450 | 42.3 | 0.90 | 85 | 51 | 43 |

Comparison Example IVA

This comparison example indicates the effectiveness of the additive metal of this invention and that specific metals are effective.

The catalyst preparation method, the reaction operation, and the reaction conditions were the same as those of Example IIA.

The results were as follows.

| Catalyst | Reaction temp. (°C.) | α | β | x | y | z |
|---|---|---|---|---|---|---|
| 150 Ni-10 Al₂O₃ (comparison example) | 400 | 16.0 | 0.43 | 82.0 | 22.0 | 18 |
| 150 Ni-0.5 Ru-100 Al₂O₃ (comparison example) | 400 | 16.8 | 0.21 | 99 | 19 | 19 |
| 150 Ni-0.5 Ru-100 Al₂O₃ (this invention) | 400 | 33.0 | 0.43 | 97 | 38 | 37 |

Example IB (Ni-(Ce.Tl)-Al catalyst)

(1) Catalyst preparation: impregnation into powder and drying, similarly as in Example IA.
(2) Operation: same procedure as in Example IA.
(3) Reaction conditions: same as in Example IA.
The results were as follows.

| Catalyst | Reaction temp. (°C.) | α | β | x | y | z |
|---|---|---|---|---|---|---|
| 50 Ni-2 Ce-100 Al₂O₃ | 400 | 45.3 | 0.57 | 98 | 50 | 47 |
|  | 450 | 65.2 | 1.15 | 88 | 72 | 63 |
| 50 Ni-2 Tl-100 Al₂O₃ | 400 | 39.0 | 0.57 | 95 | 45 | 43 |
|  | 450 | 53.0 | 1.01 | 87 | 60 | 52 |

Example IIB (Ni-Sb-Al catalyst)

(1) Catalyst preparation: kneading method, similarly as in Example IB.
(2) Operation: same as in Example IB.
(3) Reaction conditions: similar to those in Example IB except for a catalyst quantity of 10 g. and a WHSV of 0.91/(hr.)⁻¹.
The results were as follows.

| Catalyst | Reaction temp. (°C.) | α | β | x | y | z |
|---|---|---|---|---|---|---|
| 150 Ni-0.5 Sb-100 Al₂O₃ | 400 | 34.0 | 0.55 | 92 | 40 | 37 |

Example IIIB (Ni-(Cd, W, Ba, Na)-Al catalyst)

(1) Catalyst preparation: same as in Example IIB.
(2) The operation procedure was mostly according to that of Example IB but differed therefrom in that the reaction was started after the steam pretreatment was carried out for one hour. The reaction was carried out continuous for 10 hours, 40 minutes at 400° C., for 3 hours, 40 minutes at 420° C., and for 3 hours, 40 minutes at 450° C.

The liquid reaction product was sampled and analyzed in the period from 40 minutes to 2 hours, 40 minutes from the start of the reaction while the reaction temperature was 400° C. and in the period from 15 hours to 16 hours, 30 minutes from the start of the reaction while the reaction temperature was 450° C.

(3) Reaction conditions:
Starting material: toluene
Catalyst: 50 cc.
Pressure:
 atmospheric, LHSV=1 (hour)⁻¹
 H₂O/toluene (mole ratio)=5.87

(4) Experimental results:

| Catalyst | Reaction temp. (°C.) | α | β | x | y | z |
|---|---|---|---|---|---|---|
| 150 Ni-0.5 Cd-100 Al₂O₃ | 400 | 38.5 | 1.16 | 75 | 50 | 38 |
|  | 450 | 39.5 | 1.14 | 76 | 51 | 39 |
| 150 Ni-0.5 W-100 Al₂O₃ | 450 | 44.0 | 0.85 | 87 | 52 | 43 |
| 150 Ni-0.5 Ba-100 Al₂O₃ | 400 | 37.5 | 1.05 | 77 | 48 | 37 |
|  | 450 | 55.0 | 1.67 | 72 | 67 | 48 |
| 150 Ni-0.5 Na-100 Al₂O₃ | 400 | 47.0 | 1.18 | 79 | 57 | 45 |
|  | 450 | 60.5 | 1.26 | 84 | 69 | 58 |

Example IVB (Ni-Se-Al catalyst)

The catalyst preparation method was according to that of Example IIB except for the use of selenium oxide for the additive metal source, the selenium oxide being added and admixed during the kneading.

The operation and reaction conditions were the same as those of Example IIIB.

The results were as follows.

| Catalyst | Reaction temp. (°C.) | α | β | x | y | z |
|---|---|---|---|---|---|---|
| 150 Ni-0.5 Se-100 Al₂O₃ | 400 | 48 | 1.44 | 73 | 59 | 43 |
|  | 450 | 62 | 1.41 | 81 | 71 | 58 |

Example VB (Ni-K-Al catalyst)

The catalyst preparation, operation, and reaction conditions were as set forth in Example IIIB.

The result was as follows.

| Catalyst | Reaction temp. (°C.) | α | β | x | y | z |
|---|---|---|---|---|---|---|
| 150 Ni-0.5 K-100 Al₂O₃ | 430 | 45.5 | 0.88 | 87 | 53 | 46 |

Example VIB (dealkylation of various alkylaromatic hydrocarbons)

In this example, dealkylation was carried out with various alkylaromatic hydrocarbons as starting materials and with the use of 100 Ni-1 Tl-100 Al₂O₃ as the catalyst.

The catalyst preparation method and operation were according to Example IB. The reaction conditions were as follows.

Catalyst: 15 g.
Reaction temperature: 400° C.
Pressure: atmospheric
Rate of supply of starting material hydrocarbon: 9.33 cc./hr.
Water supply rate: 9.33 cc./hr.

| Starting material | Formed product | Liquid reaction product composition Content (wt. percent) |
|---|---|---|
| m-Xylene | Benzene | 22.2 |
|  | Toluene | 38.8 |
|  | Unreacted m-xylene | 39.0 |
| Ethylbenzene | Benzene | 36.8 |
|  | Toluene | 30.4 |
|  | Unreacted ethylbenzene | 32.8 |
| Mixed starting material [1] | Benzene | 34.4 |
|  | Toluene | 30.9 |
|  | n-Heptane | 7.9 |
|  | Cyclohexane | 6.2 |
|  | Ethylbenzene | 5.7 |
|  | m-Xylene | 14.9 |

[1] See the following table:

| Constituent | Content (wt. percent) |
|---|---|
| n-Heptane | 10.6 |
| Cyclohexane | 10.6 |
| Ethylbenzene | 39.4 |
| m-Xylene | 39.4 |

Example VIIB (dealkylation of various alkylaromatic hydrocarbons)

Dealkylation was carried out with 100 Ni-1 Ce-100 $Al_2O_3$ as catalyst and m-xylene and ethylbenzene as starting materials. The catalyst preparation method and operation were according to Example IB, and the reaction conditions were the same as those of Example VIB.
The following results were obtained.

| | Reaction liquor composition | |
|---|---|---|
| Starting material | Formed product | Content (wt. percent) |
| m-Xylene | Benzene | 13.3 |
| | Toluene | 47.9 |
| | Unreacted m-xylene | 38.8 |
| Ethylbenzene | Benzene | 34.1 |
| | Toluene | 20.2 |
| | Unreacted ethylbenzene | 45.7 |

Example VIIIB (Ni content variation)

The weight ratio Ni:Ce was fixed at 100:1, and the nickel content was varied.
The catalyst preparation method, operation, and reaction conditions were as specified in Example IB.
The results were as follows.

| Catalyst | Reaction temp. (° C.) | $\alpha$ | $\beta$ | $x$ | $y$ | $z$ |
|---|---|---|---|---|---|---|
| 50 Ni-0.5 Ce-100 $Al_2O_3$ | 450 | 49.5 | 0.68 | 96 | 55 | 53 |
| 100 Ni-1 Ce-100 $Al_2O_3$ | 450 | 60.6 | 1.28 | 83 | 68 | 56 |

Example IXB (Tl, Ce content variation)

The weight ratio Ni:$Al_2O_3$ was fixed at 50:100, and the contents of Tl and Ce were varied.
The catalyst preparation method, operation, and reaction conditions were as set forth in Example IB.
The results were as follows.

| Catalyst | Reaction temp. (° C.) | $\alpha$ | $\beta$ | $x$ | $y$ | $z$ |
|---|---|---|---|---|---|---|
| 50 Ni-0.05 Tl-100 $Al_2O_3$ | 400 | 33.3 | 0.49 | 95 | 39 | 37 |
| | 450 | 49.5 | 0.97 | 87 | 57 | 50 |
| 50 Ni-0.5 Tl-100 $Al_2O_3$ | 400 | 32.6 | 0.38 | 99 | 36 | 36 |
| | 450 | 43.7 | 0.60 | 96 | 49 | 47 |
| 50 Ni-2Tl-100 $Al_2O_3$ | 400 | 39.0 | 0.57 | 95 | 45 | 43 |
| | 450 | 53.0 | 1.01 | 87 | 60 | 52 |

| Catalyst | Reaction temp. (° C.) | $\alpha$ | $\beta$ | $x$ | $y$ | $z$ |
|---|---|---|---|---|---|---|
| 50 Ni-0.05 Ce-100 $Al_2O_3$ | 450 | 57.3 | 0.29 | 100 | 59 | 59 |
| 50 Ni-0.5 Ce-100 $Al_2O_3$ | 450 | 49.5 | 0.68 | 96 | 55 | 53 |
| 50 Ni-2 Ce-100 $Al_2O_3$ | 400 | 45.3 | 0.57 | 98 | 50 | 49 |
| | 450 | 65.2 | 1.15 | 88 | 72 | 63 |
| 50 Ni-5 Ce-100 $Al_2O_3$ | 400 | 47.7 | 0.60 | 93 | 52 | 48 |

Example XB (Ni-Ce-Al catalyst)

The catalyst preparation method, operation, and reaction conditions were according to Example IIB.
The results were as follows.

| Catalyst | Reaction temp. (° C.) | $\alpha$ | $\beta$ | $x$ | $y$ | $z$ |
|---|---|---|---|---|---|---|
| 150 Ni-0.5 Ce-100 $Al_2O_3$ | 400 | 49.6 | 0.56 | 99 | 53 | 52 |

Comparison Example IB (Effect of additive metal)

The same catalyst preparation method, operation, and reaction conditions as in Example IB were used.
The results were as follows.

| Catalyst | Reaction temp. (° C.) | $\alpha$ | $\beta$ | $x$ | $y$ | $z$ |
|---|---|---|---|---|---|---|
| 50 Ni-100 $Al_2O_3$ (comparison example) | 400 | 23.0 | 0.54 | 84 | 30 | 25 |
| 50 Ni-2 Ce-100 $Al_2O_3$ (this invention) | 400 | 45.3 | 0.57 | 98 | 50 | 49 |

Comparison Example IIB (Effect of additive metal)

The catalyst preparation method, operation, and reaction conditions were as set forth in Example IIB.
The results were as follows.

| Catalyst | Reaction temp. (° C.) | $\alpha$ | $\beta$ | $x$ | $y$ | $z$ |
|---|---|---|---|---|---|---|
| 150 Ni-100 $Al_2O_3$ (comparison example) | 400 | 16.0 | 0.43 | 82 | 22 | 18 |
| 150 Ni-0.5 Sb-100 $Al_2O_3$ (this invention) | 400 | 34.0 | 0.55 | 92 | 40 | 37 |

Comparison Example IIIB (Effect of additive metals)

The catalyst preparation method, operation, and reaction conditions were as set forth in Example IIIB.
The results were as follows.

| Catalyst | Reaction temp. (° C.) | $\alpha$ | $\beta$ | $x$ | $y$ | $z$ |
|---|---|---|---|---|---|---|
| 150 Ni-100 $Al_2O_3$ (comparison example) | 400 | 27.0 | 0.68 | 82 | 25 | 29 |
| | 450 | 37.5 | 1.01 | 78 | 47 | 37 |
| 150 Ni-0.5 Na-100 $Al_2O_3$ (this invention) | 400 | 47.0 | 1.18 | 79 | 57 | 45 |
| | 450 | 60.5 | 1.26 | 84 | 69 | 58 |
| 150 Ni-0.5 Se-100 $Al_2O_3$ (this invention) | 450 | 48 | 1.44 | 73 | 59 | 43 |
| | 450 | 62 | 1.44 | 81 | 71 | 58 |

Example IC (Ni-Re-Al catalyst)

(1) Catalyst preparation: impregnation into powder and drying, similarly as set forth in Example IA.
(2) Operation: same as in Example IA.
(3) Reaction conditions: same as in Example IA.
(4) Results:

| Catalyst | Reaction temp. (° C.) | $\alpha$ | $\beta$ | $x$ | $y$ | $z$ |
|---|---|---|---|---|---|---|
| 50 Ni-0.5 Re-100 $Al_2O_3$ | 400 | 39.5 | 0.50 | 97 | 44 | 43 |

Example IIC (Re content variation)

In this example, an activity test was carried out by holding the weight ratio Ni:$Al_2O_3$ constant 50:100 and using catalysts of varying Re content.

The catalyst preparation, operation, and reaction conditions were as set forth in Example IC.
The results were as follows.

| Catalyst | Reaction temp. (° C.) | α | β | x | y | z |
|---|---|---|---|---|---|---|
| 50 Ni-0.5 Re-100 Al₂O₃*  | 400 | 37.5 | 0.50 | 97 | 44 | 43 |
| 50 Ni-2 Re-100 Al₂O₃     | 400 | 40.9 | 0.59 | 95 | 46 | 44 |
| 50 Ni-5 Re-100 Al₂O₃     | 400 | 48.2 | 0.66 | 76 | 53 | 51 |

* Example IC.

Example IIIC (dealkylation of various alkylaromatic hydrocarbons)

In this example, dealkylation was experimentally carried out with various alkylaromatic hydrocarbons as starting materials and 100 Ni-1 Re-100 Al₂O₃ as catalyst.

The catalyst preparation and operation were as set forth in Example IC. The reaction conditions were as follows.

Catalyst: 15 g.
Reaction temperature: 400° C.
Pressure: atmospheric
Rate of supply of starting material hydrocarbon: 9.33 cc./hr.
Water supply rate: 9.33 cc./hr.

The results were as follows.

| Starting material | Formed product | Liquid reaction product composition Content (wt. percent) |
|---|---|---|
| m-Xylene | Benzene | 38.9 |
|  | Toluene | 31.6 |
|  | Unreacted m-xylene | 29.5 |
| Ethylbenzene | Benzene | 40.6 |
|  | Toluene | 20.2 |
|  | Unreacted ethylbenzene | 39.2 |
| Mixed starting material¹ | Benzene | 47.9 |
|  | Toluene | 27.2 |
|  | n-Heptane | 3.8 |
|  | Cyclohexane | 2.9 |
|  | Ethylbenzene | 5.0 |
|  | m-Xylene | 13.2 |

¹ See the following table.

| Constituent | Content (wt. percent) |
|---|---|
| n-Heptane | 10.6 |
| Cyclohexane | 10.6 |
| Ethylbenzene | 39.4 |
| m-Xylene | 39.4 |

Comparison Example IC

This example indicates that the reaction temperature in the process of this invention is of a critical nature and that a suitable value thereof is from 350 to 500° C.

The catalyst preparation, operation, and reaction conditions were as set forth in Example IC. The catalyst used was 100 Ni-1Re-100 Al₂O₃.

The results were as follows.

| Reaction temp. (° C.) | α | β | x | y | z |
|---|---|---|---|---|---|
| 300 (comparison example) | 11.7 | 0.19 | 93 | 14 | 13 |
| 400 (this invention)*    | 44.3 | 0.69 | 93 | 51 | 47 |
| 450 (this invention)*    | 67.0 | 1.58 | 79 | 75 | 59 |

*Comparison Example IIC.

Comparison Example IIC (Ni content variation)

In a Ni-Re-Al₂O₃ catalyst, the weight ratio Ni:Re was held constant at 100:1 while the Ni content was varied. With the resulting catalyst, an activity test was carried out.

The catalyst preparation, operation, and reaction conditions were as set forth in Example IC.

The following results were obtained.

| Catalyst | Reaction temp. (° C.) | α | β | x | y | z |
|---|---|---|---|---|---|---|
| 50 Ni-0.5 Re-100 Al₂O₃  | *400 | 39.5 | 0.50 | 97 | 44 | 43 |
|                         | 450  | 66.6 | 1.00 | 93 | 72 | 67 |
| 100 Ni-1 Re-100 Al₂O₃   | **400 | 44.3 | 0.69 | 93 | 51 | 47 |
|                         | **450 | 67.0 | 1.58 | 79 | 75 | 59 |

*Example IC.
**Comparison Example IC.

Comparison Example IIIC (Effect of Re)

(1) The catalyst preparation method was as set forth in Example IC.

(2) The operation was as specified in Example IC except that the reaction was started after one hour of steam treatment. The reaction was carried out continuously for 10 hours, 40 minutes at 400° C., for 3 hours, 40 minutes at 420° C., and then for 3 hours, 40 minutes at 450° C.

The liquid reaction product was sampled and analized in the period from 40 minutes to 2 hours, 40 minutes from the start of the reaction for the reaction temperature of 400° C. and in the period from 15 hours to 16 hours, 30 minutes after the start of the reaction for the reaction temperature of 450° C.

(3) The reaction conditions were as follows.

Starting material: toluene
Catalyst quantity: 50 cc.
Reaction temperature: 400° C., 450° C.
Pressure: atmospheric pressure
LHSV = 1.0
H₂O/toluene (mole ratio) = 5.87

(4) Results:

| Catalyst | Reaction temp. (° C.) | α | β | x | y | z |
|---|---|---|---|---|---|---|
| 100 Ni-100 Al₂O₃ (comparison example)     | 400 | 12   | 0.22 | 90 | 15 | 14 |
|                                            | 450 | 20   | 0.40 | 88 | 25 | 22 |
| 100 Ni-1 Re-100 Al₂O₃ (this invention)    | 400 | 33   | 0.62 | 89 | 39 | 35 |
|                                            | 450 | 40.7 | 0.80 | 87 | 48 | 42 |

We claim:

1. A process for the catalytic steam dealkylation of alkyl aromatic hydrocarbons which process consists essentially of dealkylating an alkylaromatic hydrocarbon in an atmosphere consisting essentially of steam by contacting a catalyst with a mixture of an alkyl aromatic hydrocarbon and steam at a temperature of from 350° C. to 500° C. at a pressure of from atmospheric pressure to 30 kg./cm.², said catalyst consisting essentially of nickel and rhenium and alumina as a carrier.

2. The process according to claim 1 in which the catalyst is prepared by impregnating the carrier material with a solution of a compound of the catalytic metal which compound decomposes upon being heated to become the metal or an oxide thereof and drying and heating the resulting material thus impregnated to decompose said compound and thereby to form the metal or an oxide thereof on the carrier.

3. The process according to claim 1 in which the catalyst is prepared by kneading a compound of the catalytic metal which decomposes upon being heated to become the metal or an oxide thereof together with a carrier material and drying and heating the resulting material thus kneaded to decompose said compound and thereby to form the metal or an oxide thereof on the carrier.

4. A process for the catalytic steam dealkylation of alkyl aromatic hydrocarbons which process consists essentially of dealkylating an alkylaromatic hydrocarbon in an atmosphere consisting essentially of steam by contacting a catalyst with a mixture of an alkyl aromatic hydrocarbon and steam at a temperature of from 350° C. to 500° C. at a pressure of from atmospheric pressure to 30 kg./cm.², said catalyst consisting essentially of nickel and thallium and alumina as a carrier.

5. A process for the catalytic steam dealkylation of alkyl aromatic hydrocarbons which process consists essentially of dealkylating an alkylaromatic hydrocarbon in an atmosphere consisting essentially of steam by contacting a catalyst with a mixture of an alkyl aromatic hydrocarbon and steam at a temperature of from 350° C. to 500° C. at a pressure of from atmospheric pressure to 30 kg./cm.², said catalyst consisting essentially of nickel and cerium and alumina as a carrier.

6. The process according to claim 4 in which the catalyst is prepared by impregnating the carrier material with a solution of a compound of the catalytic metal which compound decomposes upon being heated to become the metal or an oxide thereof and drying and heating the resulting material thus impregnated to decompose said compound and thereby to form the metal or an oxide thereof on the carrier.

7. The process according to claim 4, in which the catalyst is prepared by kneading a compound of the catalytic metal which decomposes upon being heated to become the metal or an oxide thereof together with a carrier material and drying and heating the resulting material thus kneaded to decompose said compound and thereby to form the metal or an oxide thereof on the carrier.

8. The process according to claim 5, in which the catalyst is prepared by impregnating the carrier material with a solution of a compound of the catalytic metal which compound decomposes upon being heated to become the metal or an oxide thereof and drying and heating the resulting material thus impregnated to decompose said compound and thereby to form the metal or an oxide thereof on the carrier.

9. The process according to claim 5, in which the catalyst is prepared by kneading a compound of the catalytic metal which decomposes upon being heated to become the metal or an oxide thereof together with a carrier material and drying and heating the resulting material thus kneaded to decompose said compound and thereby to form the metal or an oxide thereof on the carrier.

References Cited
UNITED STATES PATENTS

| | | | |
|---|---|---|---|
| 2,960,545 | 11/1960 | Seubold | 260—672 R |
| 3,291,850 | 12/1966 | Carson | 260—672 R |
| 3,595,932 | 7/1971 | Maslyansky et al. | 260—672 R |
| 3,666,824 | 5/1972 | Jenkins | 260—672 R |
| 3,691,247 | 9/1972 | Billings | 260—672 R |

CURTIS R. DAVIS, Primary Examiner